United States Patent [19]

Ogawa

[11] Patent Number: 4,740,846
[45] Date of Patent: Apr. 26, 1988

[54] INFORMATION SIGNAL RECORDING APPARATUS

[75] Inventor: Masahiko Ogawa, Tokyo, Japan

[73] Assignee: Canon Kabushiki Kaisha, Tokyo, Japan

[21] Appl. No.: 17,026

[22] Filed: Feb. 18, 1987

Related U.S. Application Data

[63] Continuation of Ser. No. 749,290, Jun. 26, 1985, abandoned.

[30] Foreign Application Priority Data

Jun. 29, 1984 [JP] Japan .............................. 59-135839

[51] Int. Cl.$^4$ .............................................. G11B 5/03
[52] U.S. Cl. ..................................................... 360/66
[58] Field of Search .......................................... 360/66

[56] References Cited

U.S. PATENT DOCUMENTS

| | | | |
|---|---|---|---|
| 3,838,446 | 9/1974 | Otsuka et al. ...................... | 360/19.1 |
| 3,860,958 | 1/1975 | Hanson ............................... | 360/118 |
| 3,900,894 | 8/1975 | Aziz ..................................... | 360/66 |

Primary Examiner—Vincent P. Canney
Attorney, Agent, or Firm—Toren, McGeady & Associates

[57] ABSTRACT

An information signal recording apparatus is arranged to selectively supply either a first information signal or a second information signal to recording apparatus for recording the information signal in a track on a record bearing medium; and to control the erasing action of erasing apparatus for erasing the track in association with the selecting operation on the first or second signal.

5 Claims, 3 Drawing Sheets

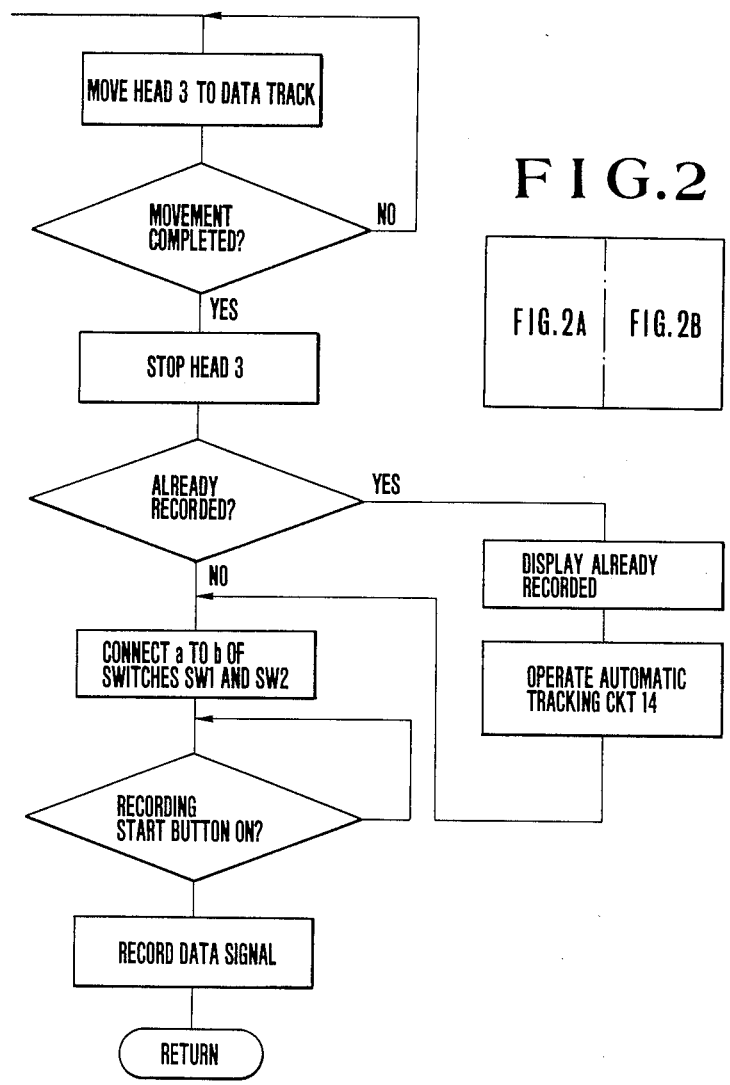

INFORMATION SIGNAL RECORDING APPARATUS

This is a continuation of application Ser. No. 749,290, filed June 26, 1985, now abandoned.

BACKGROUND OF THE INVENTION

1. Field of the Invention

This invention relates to an information signal recording apparatus and more particularly to an apparatus having recording means for recording an information signal in a track on a record bearing medium and means for erasing the track.

2. Description of the Prior Art

Among apparatus of the above-stated kind, video tape recorders, video disc recorders, etc. which record and reproduce video signals on and from magnetic record bearing media have been well known.

The record bearing medium mentioned above permits recording not only of video signals but also of different data signals. Therefore, control data signals of varied kinds can be recorded in a part of the record bearing medium. With such control data thus recorded, various advantages can be obtained by controlling a reproducing device or a device connected to a printer, a facsimile device, etc.

However, in the case of a video signal and particularly a color video signal, an extremely wide recording band is necessary. For example, in the case where a chrominance signal is recorded in a low band and a luminance signal in a high band, if recording is made over a previously recorded video signal without erasing it, the chrominance signal component of the previous signal cannot be completely erased by the recording. In that event, therefore, the chrominance signal of the new video signal would be distorted and would result in uneven or smeary colors of a reproduced signal.

The data signal, on the other hand, permits recording of many data even within a narrow band width. Since the data signal are thus recorded in a narrow band width, any previously recorded data signal can be completely erased when a new data signal is recorded over the previously recorded data signal.

Furthermore, in cases where a record bearing medium is new or has no information signal recorded thereon, an erasing operation on the medium is meaningless in general. Therefore, erasing means is not necessary in that instance. However, without erasing means, it is impossible to completely erase a recorded signal which has a wide band width, such as in the case of a video signal as mentioned above. While, use of erasing means is thus sometimes necessary, arrangement to have an erasing operation always performed would result in a wasteful consumption of electrical energy. Moreover, in cases where one and the same head is to be used for both recording and erasing, in particular, unnecessorily long period of time will be required for recording.

It is a princrpal object of this invention to solve the above-state problems. It is another object of this invention to provide an information signal recording apparatus which is capable of always satisfactorily recording information signals and keeping electric energy consumption at a minimum.

It is a further object of this invention to provide an information signal recording apparatus which is capable of always satisfactorily recording information signals and shortening a period of time required in recording the information signal on the whole.

The above and other objects and features of the invention will appear more fully hereinafter from consideration of the following detailed description of a preferred embodiment thereof taken in conjunction with the accompanying drawings.

SUMMARY OF THE INVENTION

To attain the objects, an information signal recording apparatus arranged according to this invention in a preferred embodiment thereof comprises: recording means for recording an information signal in a track on a record bearing medium; selecting means for selectively supplying either a first information signal or a second informatron signal to the recording means; erasing means for erasing a singal recorded in the track; and control means for controlling the erasing action of the erasing means on the track in association with the operation of the selecting means.

To attain the last object, an information signal recording apparatus arranged according to this invention as a preferred embodiment thereof comprises: recording means for recording an information signal in a recording track on a record bearing medium; erasing means for erasing a signal previously recorded in the recording track prior to recording by the recording means; instructing means for instructing the recording means to record an information signal; first control means arranged to cause the erasing means to erase a signal recorded in the recording track in response to the instruction of the instructing means and then to cause the recording means to record an information signal in the recording track which has been erased by the erasing means; and second control means arranged to cause the recording means to immediately record an information signal in the recording track in response to the instruction of the instructing means.

BRIEF DESCRIPTION OF THE DRAWINGS

FIG. 2, 2a and 2b are a control program flow chart showing the operation or the apparatus shown FIG. 1.

DETAILED DESCRIPTION OF THE PREFEFFED EMBODIMENT

Figure 1:
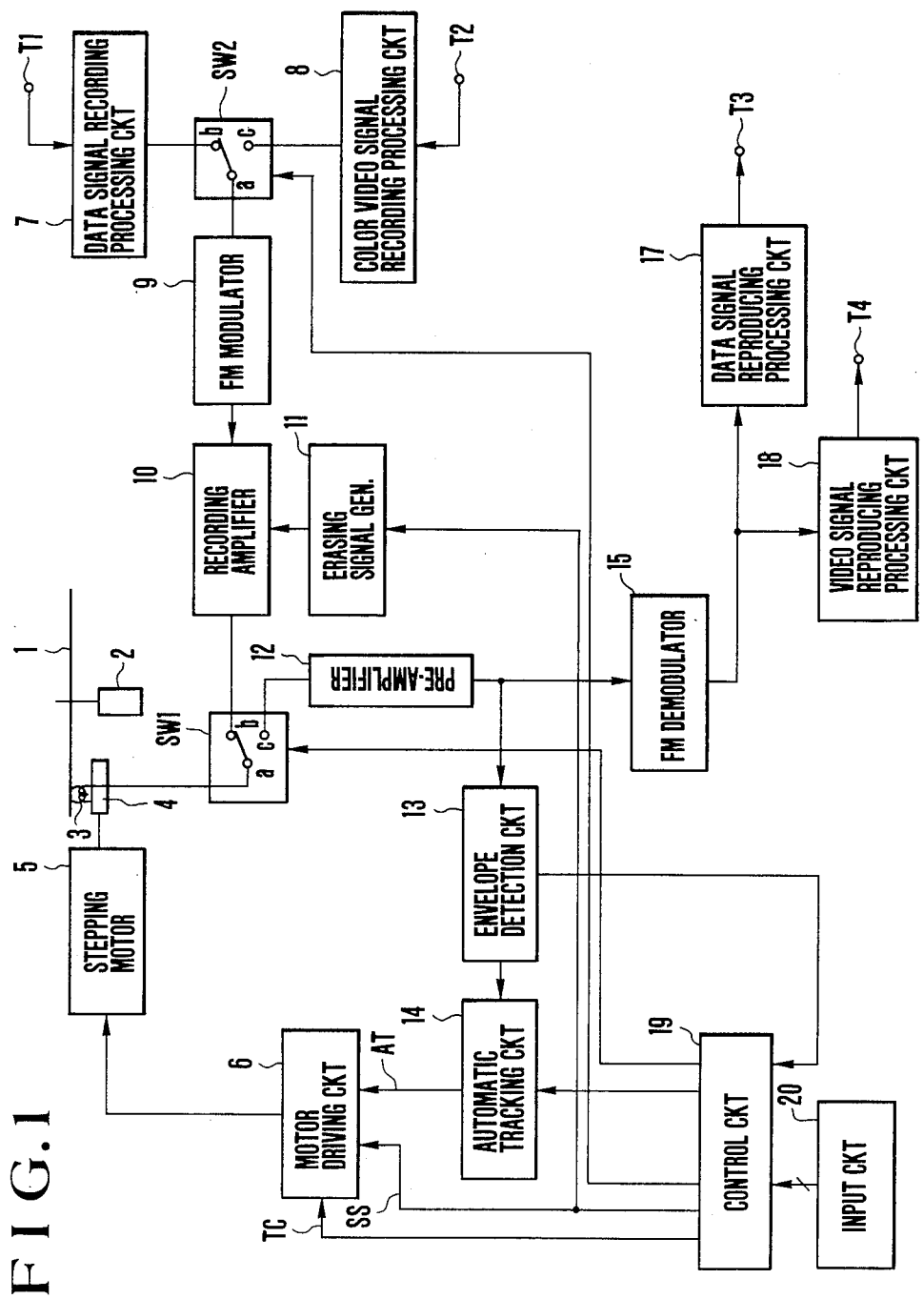
FIG. 1 is a control block diagram of a recording and reproducing apparatus arranged according to this invention in an embodiment thereof.

An embodiment of this invention is arranged as described below:

Referring to FIG. 1, the illustration includes a circular magnetic disc 1; a motor 2 for rotating the disc 1; a magnetic head 3 arranged to record, reproduce and erase a color video signal and a data signal; a head feeding carriage arranged to move the magnetic head 3 in the direction of the radius of the disc 1; a stepping motor 5 arranged to move the head feeding carriage 3; a motor driving circuit 6 arranged to drive the stepping motor 5 and to receive a track change-over signal TC, an automatic tracking signal AT for reproduction and a vibration signal SS for vibrating the head 3 in the radial direction at the time of an erasing operation; a data signal recording processing circuit 7; a color video signal recording processing circuit 8; an FM modulator 9; a recording amplifier 10; an erasing signal generator 11; a pre-amplifier 12; an envelope detection circuit 13; an automatic tracking circuit 14 which causes automatic tracking to be performed by driving the motor driving circuit 6 in such a way as to increase the output of the envelope detection circuit 13; an FM demodulator 15 for demodulating a reproduced signal; a data signal reproducing processing circuit 18; a control circuit 19 for controlling the whole apparatus; and an input circuit 20 arranged to instruct from outside the apparatus to perform recording or reproduction of a data signal and recording or reproduction of a video signal.

The embodiment is provided with a data signal input terminal T1; a video signal input terminal T2; a data signal output terminal T3; and a video signal output terminal T4. A recording/erasing/reproduction change-over switch SW1 is arranged to have its contact pieces "a" and "c" connected to each other for recording and erasing. An input change-over switch SW2 is arranged to have its contact pieces "a" and "b" connected to each other in selecting a data signal and to have its contact pieces "a" and "c" interconnected in selecting a video signal.

Figure 2A:
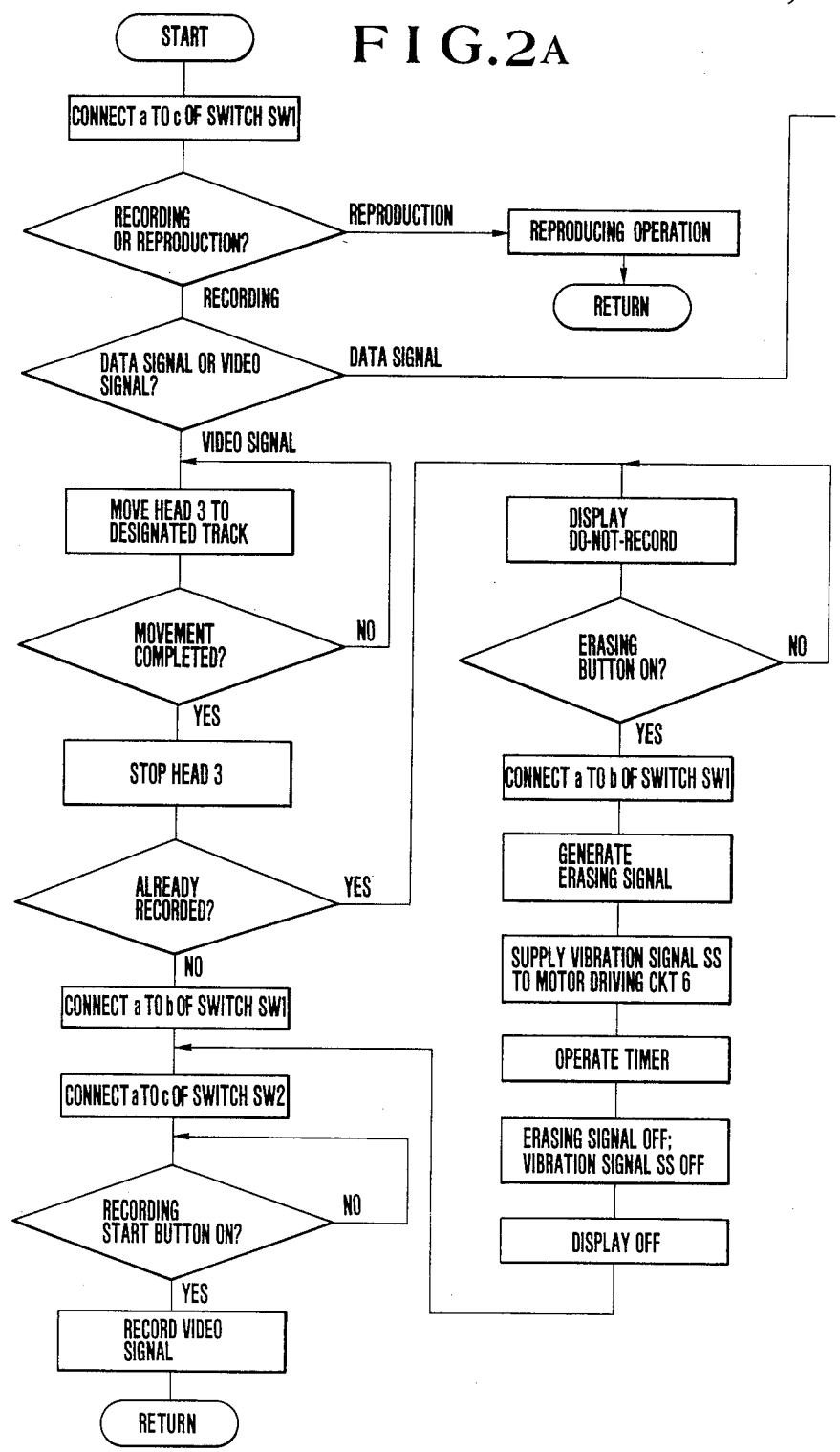

Referring to FIG. 2 which is a control program flow chart, the apparatus of FIG. 1 operates as follows: The control program is stored at a ROM within the control circuit 19 of FIG. 1. First, the switch SW1 has its contact pieces "a" and "c" interconnected. Next, it is judged at the input circuit 20 whether recording or reproduction is selected. If a reproducing operation has been selected, the output of the envelope detection circuit 13 causes the automatic tracking circuit 14 to operate. The head 3 is shifted to the optimum position thereof to obtain a reproduced signal. The reproducing operation is performed in a manner which is well known and requires no detailed description here.

In selecting recording, it is judged whether the recording operation is to be performed on a data signal or on a video signal. In the case of recording a video signal, the head 3 is shifted to a recording track designated at the input circuit 20. Upon arrival of the head 3 at the track designated, the head 3 comes to a stop. Then, whether the track has been already recorded or has not been recorded is discriminated from the output of the envelope detection circuit 13. In the event that the track has been recorded, recording is not allowed. A display device, which is not shown, then makes a display indicating that no recording is allowed. Following this, when an erasing button is pushed within the input circuit 20, the switch SW1 has its contact pieces "a" and "b" interconnected. In this instance, the erasing signal generator 11 generates an erasing signal. At the same time, a vibration signal SS is supplied to the motor driving circuit 6 to cause the head 3 to vibrate to a slight degree. In this manner, a recorded signal is erased completely throughout the whole recording zone. Upon completion of the erasing action, a timer causes the erasing signal, the vibration signal SS and the do-not-record display to turn off respectively. The switch SW2 is then connected between its contact pieces "a" and "c". Then when a recording start button is pushed within the input circuit 20, a video signal is recorded.

If the designated recorded track has not been recorded with any signal, the video signal is recorded thererin.

A recording operation on a data signal is as follows: The data signal is arranged to be recorded solely in a specific track other than the video signal recording track of the disc 1 (hereinafter referred to as the data track). With data signal recording selected, therefore, the head 3 shifts its position, to the data track and comes to a stop there. In the case that the data track has been already recorded, a display is made to show that the track has been recorded and then the automatic tracking circuit 14 is actuated to bring the head 3 to a position right below the data track. In this instance, the head 3 is not inhibited from recording. Both the switches SW1 and SW2 are respectively connected between contact pieces "a" and "b". When the recording start button is pushed, the data signal is recorded in the data track.

As mentioned in the foregoing, a video signal is recorded after a previous record has been completely erased. Therefore, a reproduced image can be obtained with high picture quality with no chrominance signal of a low zone of the previous record left there. In the case of a data signal, it can be recorded over a previous record without erasing the latter beforehand. Therefore, the period of time required for recording can be shortened and yet the data signal thus recorded can never be degraded in quality by the overlapping recording. The embodiment is also advantageous in terms of interchangeability with other recording and reproducing apparatus.

The advantage of this invention is conspicuous especially where one and the same head is arranged to perform three combined functions of recording, reproduction and erasing.

What is claimed is:

1. An information signal recording apparatus, comprising:
   (a) head means for tracing on a record bearing medium which has a first area for a first information signal and a second area for a second information signal, said first information signal having a wider bandwidth than said second information signal;
   (b) moving means for moving said head means relative to said record bearing medium;
   (c) recording means for selectively supplying either said first information signal or said second information signal to said head means;
   (d) erasing means for supplying an erasing signal to said head means;
   (e) discriminating means for discriminating whether a signal is reproduced from the record bearing medium by said head means; and
   (f) control means for controlling the supply of the erasing signal to said head means by said erasing means, said control means being arranged to permit the supply of the erasing signal to said head means by said erasing means before the recording operation by said head means only when said head means is arranged on said first area and said discriminating means discriminates that the signal has already been recorded on said first area.

2. An apparatus according to claim 1, wherein said discriminating means includes an envelope detection circuit for detecting the signal reproduced by said head means.

3. An apparatus according to claim 2, further comprising;
   tracking control means for controlling a relative position of said record bearing medium with respect to said head means on the basis of output signals of said envelope detection circuit.

4. An apparatus according to claim 1, wherein said first information signal includes a video signal.

5. An apparatus according to claim 1, wherein said recording means includes switching means for selectively emitting one of said first information signal and said second information signal, and FM modulation means for FM modulating the signal output from said switching means to supply the modulated signal to said head means.

* * * * *